United States Patent [19]

Smith et al.

[11] Patent Number: 5,072,852
[45] Date of Patent: Dec. 17, 1991

[54] RECEPTACLE WITH IMPROVED FEATURES FOR FACILITATING SEPARATING OF RECYCLABLE TRASH

[76] Inventors: Donald D. Smith, 257 10th St.; Betty J. Winfrey, 202 Vine, both of Burlington, Colo. 80807

[21] Appl. No.: 584,169

[22] Filed: Sep. 18, 1990

[51] Int. Cl.⁵ .............................................. B65D 25/16
[52] U.S. Cl. .................................. 220/404; 220/532; 220/345; 220/909; 220/524
[58] Field of Search ............... 220/524, 404, 909, 532, 220/345

[56] References Cited

U.S. PATENT DOCUMENTS

| | | | |
|---|---|---|---|
| 2,603,271 | 7/1952 | Heymers | 153/10.5 |
| 2,895,782 | 7/1959 | Fragale | 220/909 |
| 2,968,235 | 1/1961 | Marica | 100/218 |
| 3,055,289 | 9/1962 | Komph, Sr. | 100/53 |
| 3,142,847 | 8/1964 | Kurrels | 220/404 |
| 3,411,722 | 11/1968 | Webber | 241/99 |
| 3,964,630 | 6/1976 | Getz | 220/404 |
| 4,338,979 | 7/1982 | Dow | 141/10 |
| 4,445,623 | 5/1984 | Kolling et al. | 220/343 |
| 4,576,310 | 3/1986 | Isgar et al. | 220/404 |
| 4,753,367 | 6/1988 | Miller et al. | 220/404 |
| 4,834,253 | 5/1989 | Crine | 220/1 T |
| 4,834,262 | 5/1989 | Reed | 220/404 |
| 4,867,328 | 3/1989 | McCarthy | 220/909 |
| 4,874,111 | 10/1989 | Heller | 220/404 |
| 4,913,308 | 4/1990 | Culbertson | 220/404 |
| 4,953,740 | 9/1990 | Koda | 220/404 |
| 4,978,018 | 12/1990 | Wood | 220/909 |

OTHER PUBLICATIONS

Home Recycling Center, Rodale's New Shelter, Feb. 82, 4 pages.
Triple Recycling Center, CGK, Catalog p. 67.

*Primary Examiner*—Joseph Man-Fu Moy
*Attorney, Agent, or Firm*—John R. Flanagan

[57] ABSTRACT

A receptacle for facilitating separating of recyclable trash includes a container body, flat panels for forming a plurality of adjustable-size separate compartments in the container body, and a single-stage single-level lid hingedly mounted on the container body. Alternatively, the receptacle can have a two-stage bi-level lid and bag retainer assembly which includes a lower annular bag retainer member and an upper cover member. The lower bag retainer member is hinged and releasably matable to the container body for holding and securing an open top edge of trash bags on the container body. The upper cover member is hinged to the lower annular bag retainer member for opening and closing and can have slidable doors to permit access to the separate compartments in the container body and the trash bags held therein. A bag retaining arrangement is mounted on a top rim of the container body and top edges of the compartment separating panels for holding the trash bags in place when the lower annular bag retainer member is released from the mated relation with the container body. A can crusher module is removably mounted to opposing portions of the interior surface of the upper container body portion or of the lower annular bag retainer member so as to overlie one of the separate compartments in the container body.

8 Claims, 6 Drawing Sheets

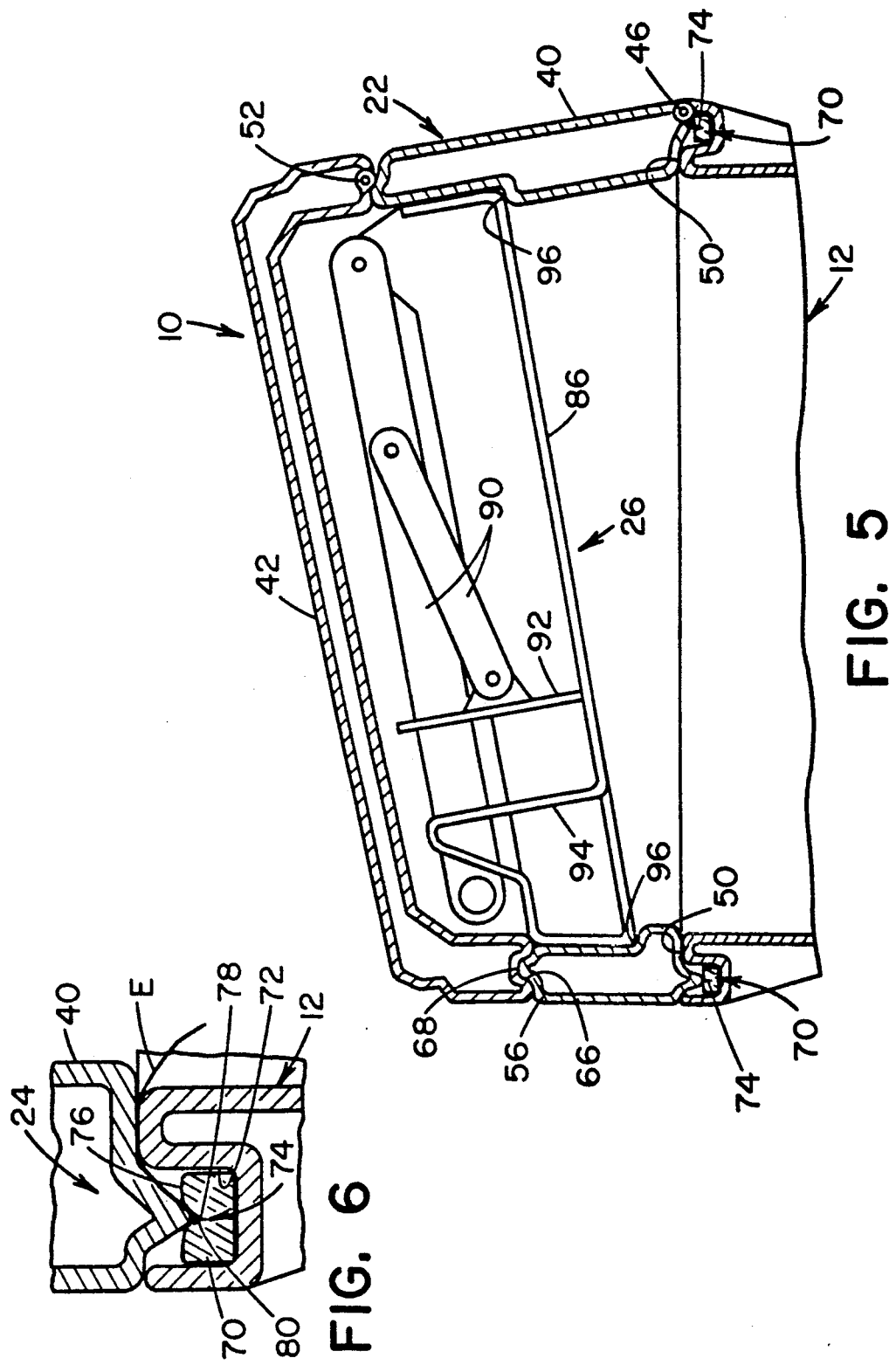

RECEPTACLE WITH IMPROVED FEATURES FOR FACILITATING SEPARATING OF RECYCLABLE TRASH

BACKGROUND OF THE INVENTION

1. Field of the Invention

The present invention generally relates to receptacles for enabling the separating of trash for recycling purposes and, more particularly, is concerned with a receptacle with improved features for facilitating separating of recyclable trash.

2. Description of the Prior Art

Use of landfills for trash and refuse disposal has had detrimental consequences for ground water quality in many parts of the United States. Many communities are turning instead to recycling of refuse materials as an alternative approach to refuse removal and disposal more compatible with the environment and long-term public health. For recycling to be successful communities are realizing that the bulk of the responsibility for separating various types of trash has to be placed onto the individual household and business where the trash is generated in the first place.

Individual acceptance of this responsibility depends to a large degree on having a suitable means for facilitating convenient, sanitary and easy separation and temporary storage of the various types of trash in the household and business. The predominate way unseparated trash is currently stored temporarily in households and business is in a waste receptacle lined with a plastic bag. Examples of such receptacles are disclosed in U.S. Pat. Nos. to Isgar et al (4,576,310) and Dow (4,338,979).

Adaptation of this current practice for promotion of separation of refuse for recycling has been proposed in the prior art. Representative examples are multiple compartment receptacles disclosed in U.S. Pat. Nos. to Crine (4,834,253), Reed (4,834,262) and Heller (4,874,111) and structures in the form of multiple plastic bag and multiple drawer holders for temporary storage of separated trash. While these receptacles and structures represent a step in the right direction, the inventors herein have perceived that these proposals fall far short of meeting the criteria of most households and businesses for an acceptable way to separate and temporarily store trash into recyclable groups.

Consequently, a pressing need exists to provide households and businesses with an attractive and sanitary product that persons will be comfortable around and feel free to use. Also, the product must be one that will unobtrusively fit in those areas currently accustomed to having a conventional trash receptacle.

SUMMARY OF THE INVENTION

The present invention provides a receptacle for facilitating separating of recyclable trash having improved features designed to satisfy the aforementioned needs. The improved features of the receptacle of the present invention provide households and businesses with an attractive and sanitary product that persons will feel comfortable around and find convenient and easy to use. Also, the receptacle can unobtrusively fit in those areas currently accustomed to having a conventional trash receptacle.

One improved feature of the receptacle of the present invention is a container body having an open top and an interior storage cavity, and a plurality of flat panels for forming a plurality of adjustable-size separate compartments in the storage cavity of the container body. Pairs of facing vertical grooves are formed on interior surfaces of front and rear walls of the container body. The flat panels are removably insertable into selected ones of the pairs of facing grooves to form the separate compartments within the cavity of the container body.

Another improved feature of the receptacle is a two-stage, bi-level lid and bag retainer assembly hingedly mounted on the container body. The lid and bag retainer assembly is composed of a lower annular bag retainer member and an upper cover member. The lower bag retainer member is hinged to the container body and releasably matable with a top rim of the container body for holding and securing the open top edge of one or more plastic bags on the top rim of the container body. The lower edge of the bag retainer member and the rim of the container body respectively have groove and tongue configurations which are mateable together for holding and securing the open top edge of the plastic bags.

The upper cover member is hinged to the lower annular bag retainer member. The upper cover member is openable and closable for permitting access to the cavity of the container body and the plastic trash bags held therein and thereby use of the enclosed receptacle to receive separated trash while sealing the container body during period of nonuse of the receptacle. The upper cover member can be solid. Alternatively, it can have a pair of panel doors and guide tracks mounting the doors for sliding movement relative to one another for gaining access to individual ones of the separate compartments holding the trash bags in the container body, without lifting the cover member.

Yet another improved feature of the receptacle is an arrangement for retaining the open top edge of the plastic trash bags to the top rim of the container body. In one embodiment of the receptacle, the retaining arrangement is provided in conjunction with the lower annular bag retainer member of the two-stage bi-level lid and bag retainer assembly. Alternatively, in another embodiment of the receptacle, the retaining arrangement is provided in conjunction with a single-stage hinged lid which opens and closes with respect to the top rim of the container body. When either the lower annular bag retainer member in the one embodiment of the receptacle or the single-stage hinged lid in the other embodiment of the receptacle is released from mated relation with the top rim of the container body, the top edge of the trash bags can be installed or removed from the retaining arrangement.

Two embodiments of the bag retaining arrangement are disclosed. One embodiment of the bag retaining arrangement is a flexible gripping strip running along a recessed channel formed in the top rim of the container body. The gripping strip has a central slit formed downwardly from its upper surface. Opposite side walls of the slot will grip and retain the top open edge of the plastic bags when inserted into the slit. The other embodiment of the bag retaining arrangement is a flexible elastic stretch cord entrained about the recessed channel of the top rim of the container body. The cord will engage and retain the top open edge of the plastic bags over the top rim of the container body.

Still another improved feature of the receptacle is a can crusher module slidably and removably mounted to tracks formed on the interior of the lower annular member of the bi-level lid and bag retainer assembly or, alternatively, on the interior of the upper portion of the container body. A further improved feature of the receptacle is a U-shaped newspaper and magazine carrier that fits within one compartment of the container body and has a handle for use in removing it.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 5 is an enlarged cross-sectional view of the receptacle of FIG. 2 with the lid and bag retainer assembly closed.

FIG. 6 is an enlarged view of a fragmentary portion of the receptacle of FIG. 5 illustrating one embodiment of the bag retaining arrangement.

DETAILED DESCRIPTION OF THE INVENTION

Figure 1:
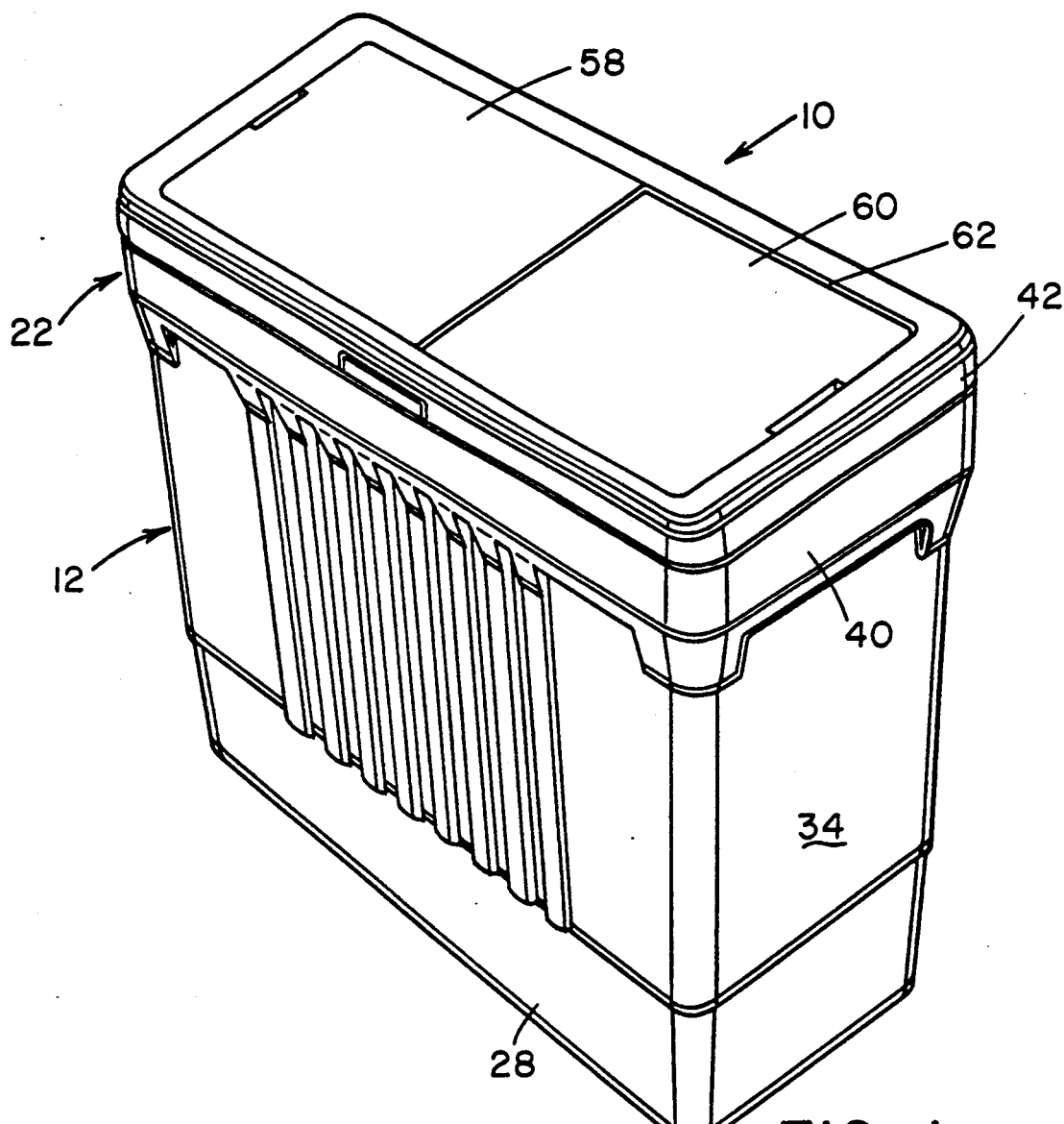
FIG. 1 is a perspective view of one embodiment of a receptacle in accordance with the present invention having a two-stage bi-level lid and bag retainer assembly shown in a closed position.

Referring to the drawings, and particularly to FIGS. 1-5, there is shown one embodiment of a receptacle of the present invention, generally designated 10, which is designed for enabling separation of different types of recyclable trash. Some of the improved features of the receptacle 10 which enhance its usefulness in promoting the recycling of trash include a container body 12 having an open top 14 and an interior storage cavity 16, and a plurality of flat panels 18 for forming a plurality of adjustable-size separate compartments 20 in the container body 12. Other improved features are a two-stage, bilevel lid and bag retainer assembly 22, a bag retaining arrangement 24, and a can crusher module 26.

The container body 12 of the receptacle 10 is composed of a front wall 28, a rear wall 30, a pair of opposite side walls 32, 34, and a bottom wall 36 being interconnected to define the open top 14 and interior cavity 16. Multiple pairs of aligned facing vertical grooves 38 are formed on the interior surfaces of the front and rear walls 28, 30. The flat panels 18 are removably insertable into selected ones of the aligned pairs of grooves 38 to form the separate storage compartments 20 within the interior cavity 16 of the container body 12.

The two-stage, bi-level lid and bag retainer assembly 22 of the receptacle 10 is hingedly mounted on the container body 12. The lid and bag retainer assembly is composed of a lower annular bag retainer member 40 and an upper cover member 42. The lower bag retainer member 40, which constitutes the first stage of the assembly 22, is hinged at 46 along the rear of its bottom edge 48 to a top rim 50 of the container body 12 and releasably engagable along its bottom edge 48 to the bag retaining arrangement 24, which will be described in detail later, disposed along the top rim 50 of the container body 12 for holding and securing the perimeter of the open top edge E of a plastic trash bag B on the top rim 50 of the container body 12.

Figure 8:
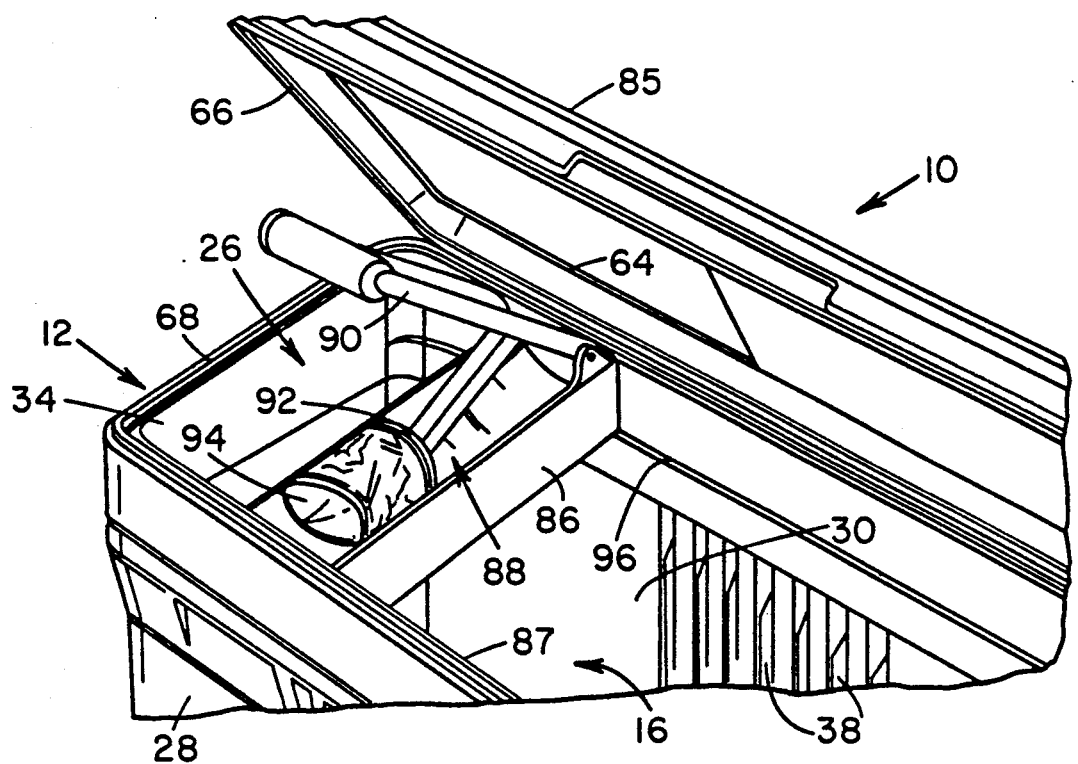
FIG. 8 is a fragmentary perspective view of another embodiment of the receptacle of the present invention having a single-stage, single-level hinged lid shown in an opened position and a can crusher module slidably mounted on a track formed on the interior of the upper portion of the container body of the receptacle.

The upper cover member 42 is hinged at 52 along the rear of its bottom edge 54 to the rear of the top edge 56 of the lower annular bag retainer member 40. The upper cover member 42 can be pivotably lifted to an opened position, as shown in FIG. 8, for permitting access to the interior storage cavity 16, and thus to the separate storage compartments 20, of the container body 12 and the plastic trash bags B held therein in order to place separated trash in the bags.

Figure 2:
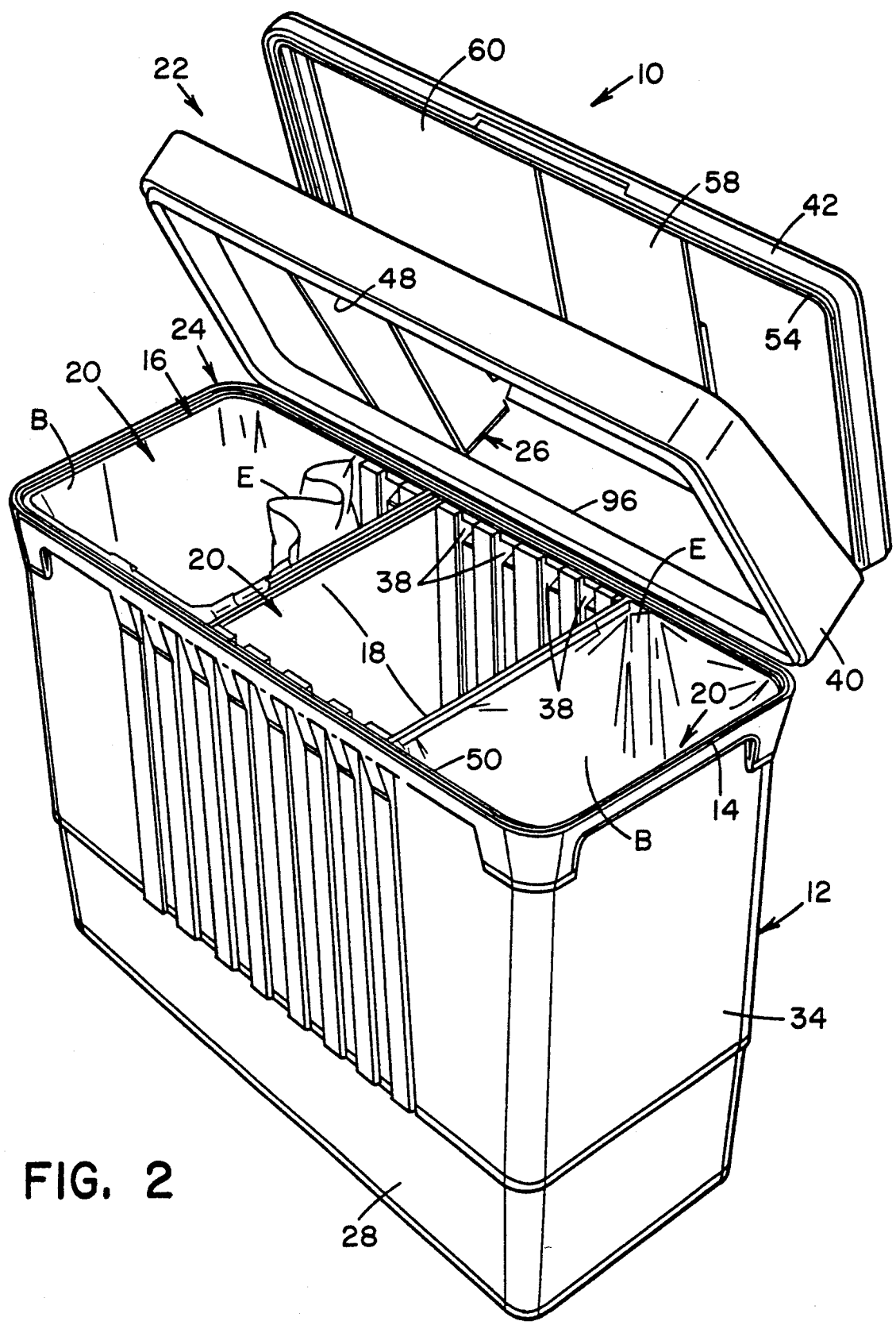
FIG. 2 is a perspective view of the receptacle of FIG. 1 with the lid and bag retainer assembly of the receptacle in an opened position.
Figure 4:
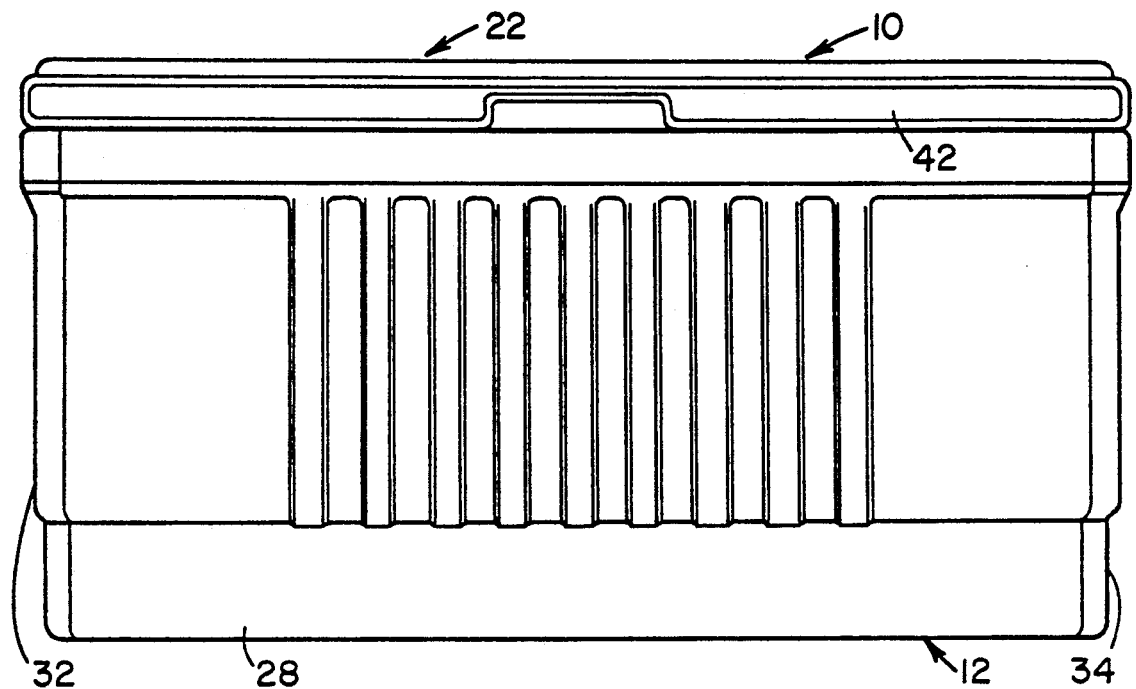
FIG. 4 is a front elevational view of the receptacle as seen along line 3—3 of FIG. 3.
Figure 3:
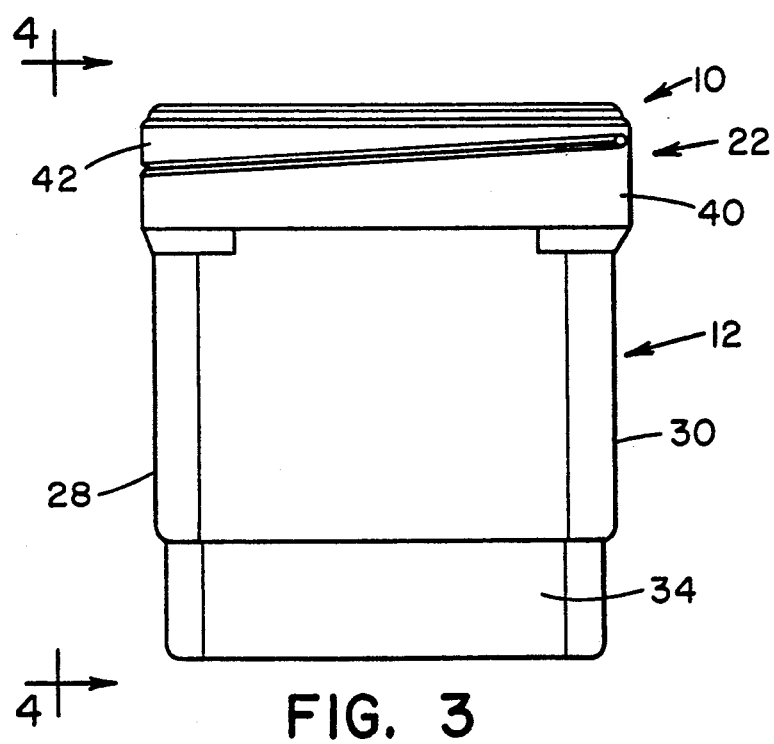
FIG. 3 is an enlarged end view of the receptacle of FIG. 1.

The upper cover member 42 can be a solid panel. Alternatively, as shown in FIGS. 1 and 2, it can have a pair of upper and lower panel doors 58, 60 and opposite aligned pairs of upper and lower guide tracks 62, 64 at the interior edges of the upper cover member 42 which respectively mount the doors 58, 60 along their opposite edges for sliding movement relative to one another. Each door 58, 60 is slid along the respective pair of guide tracks 62, 64 for gaining access to individual ones of the separate compartments 20 which hold the respective trash bags B in the container body 12. Thus, the slidable panel doors 58, 60 are employed to open and close the receptacle 10 without the necessity for lifting the upper cover member 42. When not being used, the container body 12 of the receptacle 10 can be sealed closed by sliding the doors 58, 60 away from one another to closed positions, as shown in FIG. 1.

Also, when the upper cover member 42 is closed, its bottom edge 54 has a groove 66 formed thereon which mates with a tongue 68 formed on the top edge 56 of the annular retainer member 40. This arrangement of the groove 66 and tongue 68 reduces the likelihood of accumulation of soil and debris in the downwardly-facing groove 66 where it would be more difficult to remove than on the upwardly-protruding tongue 68.

FIGS. 5 and 6 shows the lower bag retainer member 40 in a lower engaged position relative to the container body 12 where it secures the open top edge E of the trash bags B on the top rim 50 of the container body 12 with the bag extending into the storage cavity 20. FIG. 5 also shows the upper cover member 42 in a lower closed position relative to the lower bag retainer member 40 and the container body 12 where it prevents access to the storage cavity 20 except through the upper and lower panel doors 58, 60, shown in FIGS. 1 and 2.

FIG. 2 shows the lower bag retainer member 40 in an upper released position relative to the container body 12 where it permits installing and removing of the bags B to and from the storage cavity 20. FIG. 2 also shows the upper cover member 42 in an upper opened position relative to the lower bag retainer member 40 and the container body 12 where it permits access to the storage cavity 20 and the bags B therein.

Referring to FIGS. 2, 5 and 6, the bag retaining arrangement 24 is used in the receptacle 10 for retaining the open top edge E of the plastic trash bags B over the top rim 50 of the container body 12 when the lower annular bag retainer member 40 is released from its engaged relation with the top rim 50 of the container body 12. Two embodiments of the bag retaining arrangement 24 can be employed.

Referring to FIGS. 2, 5 and 6, a first embodiment of the bag retaining arrangement 24 is composed of a flexible gripping strip 70 disposed in a recessed track or channel 72 formed along the top rim 58 of the container body 12 and along the top edges of the panels 18 which divide the container body 12 in the separate compartments 20. The strip 70 can have different configurations. One preferred configuration is seen in FIGS. 5 and 6. As shown therein, the gripping strip 70 has a generally solid square cross-sectional configuration of a size which substantially fits the cross-section of the channel 72, such that the strip 70 will be retained therein primarily by friction. The strip 70 has a longitudinal slot or slit 74 formed centrally therein extending longitudinally along and downwardly from its upper surface 76. The slit 74 is defined by a pair of opposite side walls 78, 80 which face one another. The slit side walls 78, 80 will spread apart opening the slit 74 in response to application of a downwardly-directed pushing force on them to insert the top open edge E of the plastic bags B into the slit 74. The side walls 78, 80 will grip the top open edge E of the plastic bags B and tend to retain them in response to application an upwardly-directed pulling force on them used to withdraw the top open edge E of the plastic bag B from the gripping strip 70.

Figure 7:
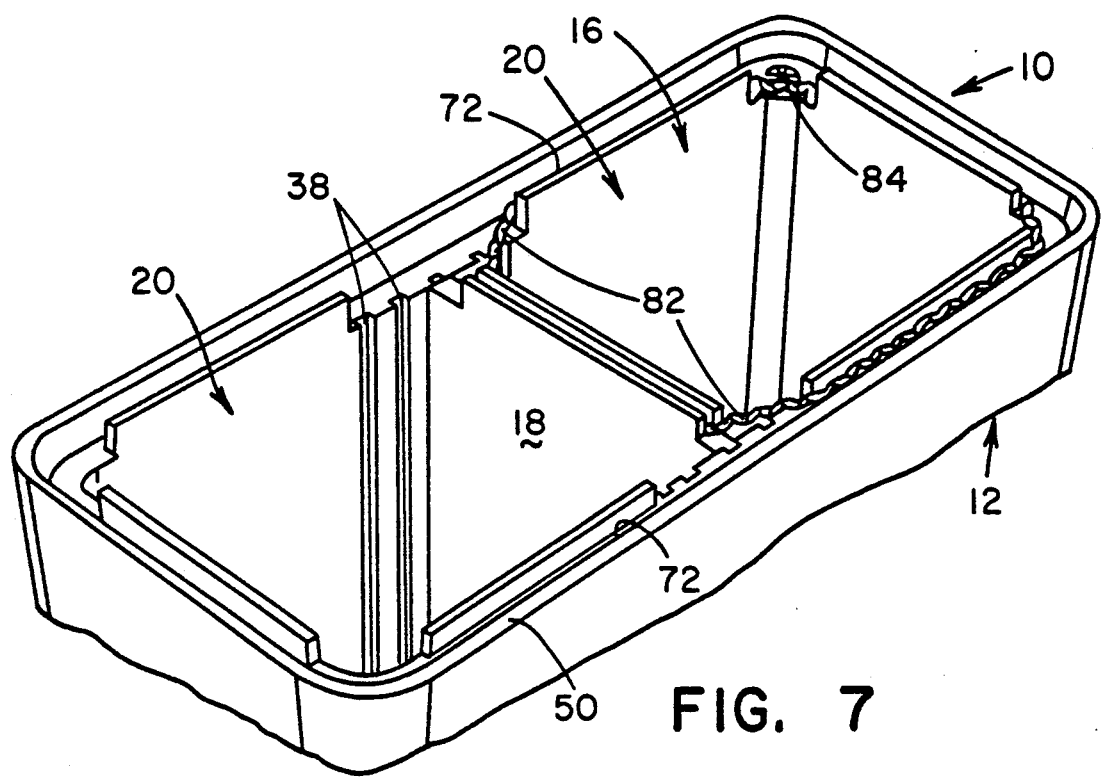
FIG. 7 is an enlarged fragmentary perspective view of the receptacle with the lid and bag retainer assembly removed to illustrate another embodiment of an arrangement for retaining the open top edge of the plastic bags over the top rim of the container body.

Referring to FIG. 7, a second embodiment of the bag retaining arrangement 24 is a flexible elastic stretch cord 82 entrained about the recessed track or channel 72 along the top rim 50 of the container body 12 and top edge of the flat panel 18. Also, the bag retaining arrangement 24 includes one or more clips 84 for attaching the cord 82 to the container body 12. The top open edge E of the plastic bag B can be inserted into the recessed channel 72 under the elastic stretch cord 82 to retain it over the top rim 50 of the container body 12.

Referring to FIG. 8, there is illustrated another embodiment of the receptacle 10 in accordance with the present invention. The receptacle 10 in this embodiment has a single-stage, single-level lid 85 hinged directly to the upper portion of the container body 12. The lower annular member 40 of the embodiment of FIGS. 1-5 is omitted in this embodiment. The single-stage lid 85 is shown in an opened position. It is openable and closable with respect to the top rim of the container body 12. In this embodiment of the receptacle 10, the previously-described bag retaining arrangement 24 mounted on the top rim 50 of the container body 12 is engaged by the single-stage lid 85 when pivoted downwardly to its closed position.

Referring to FIGS. 2, 5 and 8, there is illustrated the can crusher module 26. In the one embodiment of the receptacle 10 of FIGS. 2 and 5, the can crusher module 26 is slidably mounted on the interior of the annular retainer member 40, whereas in the other embodiment of FIG. 8, the can crusher module 26 is slidably mounted on the interior of the upper portion 87 of the container body 12. The can crusher module 26 is an optional feature that can be employed with the receptacle 10. It is removably mounted to either the lower annular bag retainer member 40 (FIGS. 2 and 5) or the container body upper portion 87 (FIG. 8).

More particularly, the can crusher module 26 includes a mounting bracket 86 extending across an upper portion of the cavity 20 of the container body 12 and removably mounted to opposing portions of the lower annular bag retainer member 40 (FIGS. 2 and 5) or the upper portion 87 of the container body 12 (FIG. 8). The module 26 also includes a can crusher mechanism 88 mounted on the mounting bracket 86 which is conventional per se having a pivotal lever arm 90 with a movable platen 92 which will crush a metal can placed between it and another platen 94 stationarily mounted on the bracket 86. A pair of shoulders 96 defined along the opposing front and rear portions of the lower bag retainer member 40 (FIGS. 2 and 5) or the upper portion 87 of the container body 12 (FIG. 8) define tracks which run the length of the receptacle 10 permitting the can crusher module 26 to be slid along the receptacle 10 to any desired position where it will be most convenience to use.

Figure 9:
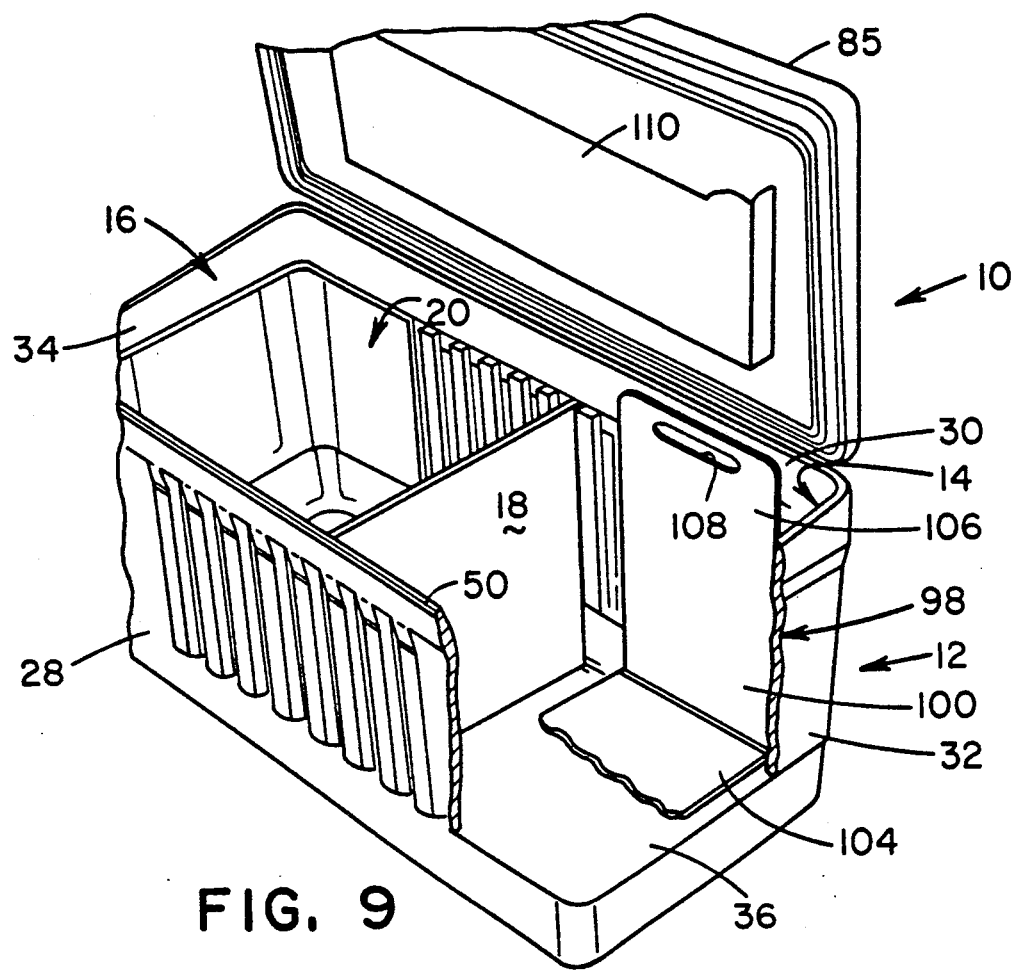
FIG. 9 is a fragmentary perspective view of still another embodiment of the receptacle of the present invention also having a single-stage, single-level hinged lid.
Figure 10:
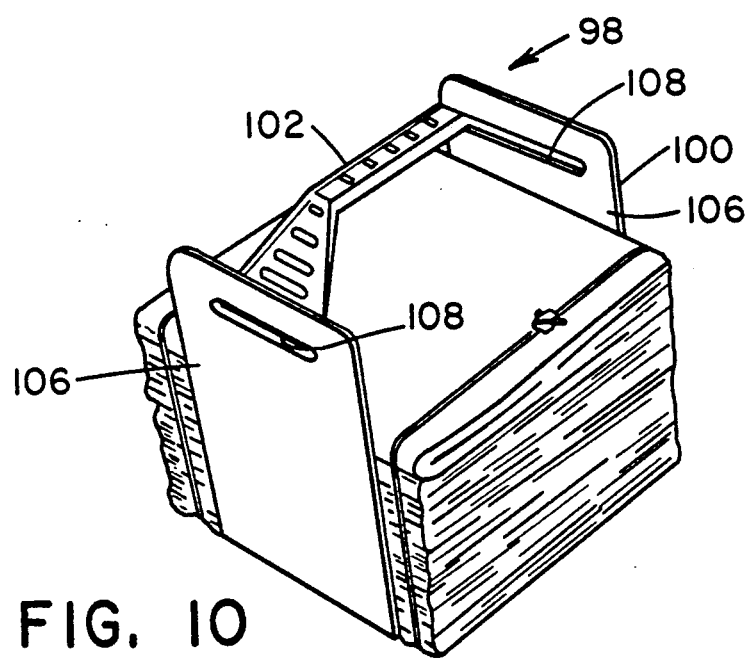
FIG. 10 is a perspective view of a newspaper carrier and handle removed from the receptacle of FIG. 9.

Referring to FIGS. 9 and 10, there is illustrated still another embodiment of the receptacle 10 of the present invention which employs a newspaper and magazine carrier 98 that fits within one of the compartment 20 of the container body 12. The carrier 98 includes a holder 100 and a handle 102 for use in lifting it into and from the one of the storage compartments 20 of the container body 12. The holder 98 has an overall U-shaped configuration being composed of a flat base 104 and a pair of upstanding opposite ends 106 rigidly attached to and extending upright from the base 104. The holder 100 also includes a slot 108 defined in the upper portion of each upstanding end 106 which receives opposite ends of the handle 102.

As shown in FIG. 9, a shelf 110 can be provided on the lower interior surface of the single-stage lid 85 of the receptacle 10 for allowing storage of and easy access to items such as string, tape and plastic ties to be used in wrapping newspapers and in tying the tops of plastic bags.

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. A receptacle for facilitating separating of recyclable trash, comprising:
   (a) a container body having an open top and an interior storage cavity;
   (b) a two-stage bi-level lid and bag retainer assembly hingedly mounted on said container body, said bi-level assembly having a lower annular bag retainer member and an upper cover member;
   (c) said lower bag retainer member being hinged to said open top of said container body for movement between an engaged position for securing an open top edge of a flexible bag on said open top of said container body with the bag extending into said storage cavity and a released position for installing and removing of the flexible bag to and from said storage cavity;

(d) said upper cover member being hinged to said lower bag retainer member for movement between an opened position for permitting access too said storage cavity and the flexible bag therein and a closed position for preventing access to said storage cavity; and (e) an arrangement for retaining the open top edge of the flexible bag on said open top of said container body when said lower annular bag retainer member is moved to said released position from said engaged position, said bag retaining arrangement including a recessed track formed about said open top of said container body and a flexible gripping strip inserted within and running along said recessed track and being configured to receive and grip the open top edge of the flexible bag.

2. The receptacle of claim 1 wherein said gripping strip has a cross-sectional configuration sized to fit within said recessed track and an elongated slit formed along and extending downwardly from an upper surface of said strip and defined by a pair of side walls for receiving and gripping the open top edge of the flexible bag between said slit side walls.

3. A receptacle for facilitating separating of recyclable trash, comprising:

(a) a container body having an open top and an interior storage cavity defined by a bottom and first and second pairs of opposing sides;

(b) means for defining separate storage compartments in said storage cavity of said container body, said compartment defining means includes at least one panel and means defined on interior surface of one of said pairs of sad opposing sides of said cavity for removably receiving and aligning said panel across said cavity for dividing said cavity into a pair of separate storage compartments;

(c) a bi-level lid and bag retainer assembly hingedly mounted on aid container body, said bi-level assembly having a lower annular bag retainer member and an upper cover member;

(d) said lower bag retainer member being hinged to said open top of said container body for movement between an engaged position for securing an open top edge of flexible bags on said open top of said container body with the bags extending into said storage compartments and a released position for installing and removing of the flexible bags to and from said storage compartments;

(e) said upper cover member being hinged to said lower bag retainer member for movement between an opened position for permitting access to said storage compartments and the flexible bag therein and a closed position for preventing access to said storage compartment; and (f) an arrangement for retaining the open top edge of the flexible bags on said open top of said container body when said lower annular bag retainer member is moved to said released position from said engaged position, said bag retaining arrangement including a recessed track formed about said open top of said container body and a flexible gripping strip inserted within and running along said recessed track and being configured to receive and grip the open top edge of the flexible bag.

4. The receptacle of claim 3 wherein said receiving and aligning means is multiple pairs of vertical grooves are formed on said interior surfaces of said one of said pairs of opposing sides of said cavity.

5. The receptacle of claim 4 wherein:
said first pair of opposing sides of said container body includes a front wall and rear wall, said receiving and aligning means being formed on said front wall and rear wall; and
said second pair of opposing sides of said container body includes a pair of opposite side walls extending between and interconnecting said front wall and rear walls.

6. The receptacle of claim 3 wherein said compartment defining means includes a plurality of flat panels for forming a plurality of adjustable-size separate compartments in said container body.

7. The receptacle of claim 3 wherein said gripping strip has a cross-sectional configuration sized to fit within said recessed track and an elongated slit formed along and extending downwardly from an upper surface of said strip and defined by a pair of side walls for receiving and gripping the open top edge of the flexible bag between said slit side walls.

8. The receptacle of claim 1 wherein said upper cover member includes:
a pair of upper and lower panel doors; and
pairs of upper and lower guide tracks respectively mounting said doors for sliding movement relative to one another for gaining access to the bags inn individual ones of said separate storage compartments without lifting said upper cover member.

* * * * *